Oct. 11, 1966 H. OZGA 3,277,928
PRE-NEEDLE APPARATUS FOR DOUBLE LIFT DOBBY MECHANISM
Filed May 19, 1964 10 Sheets-Sheet 1
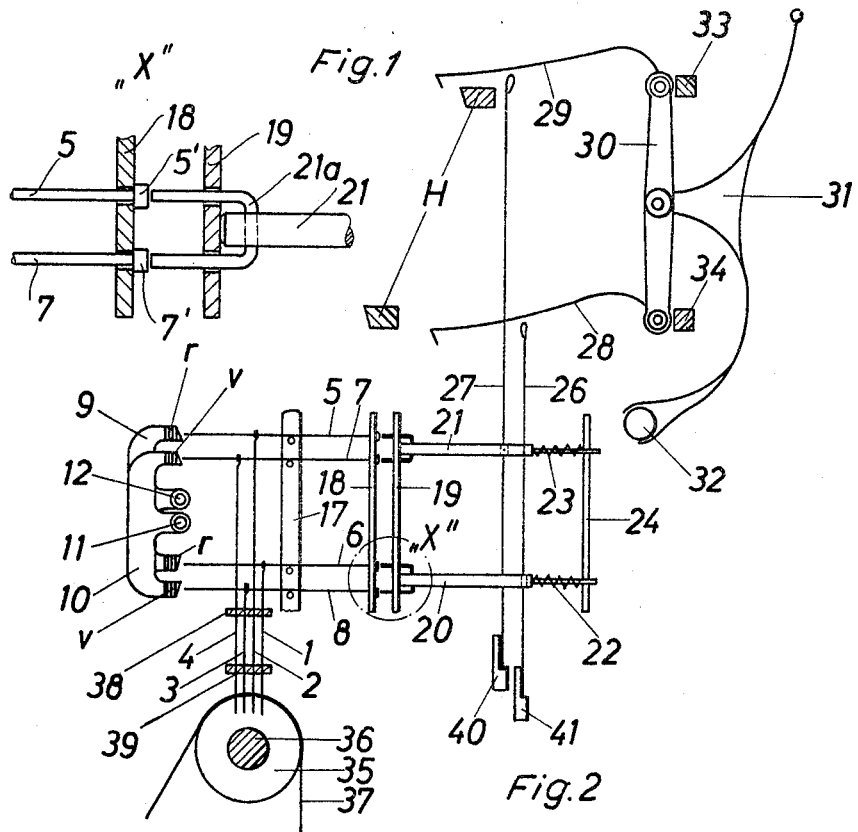
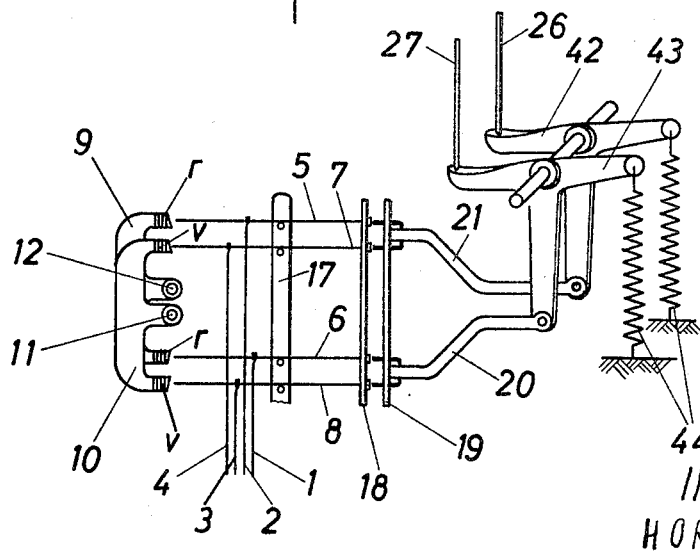
INVENTOR:
HORST OZGA

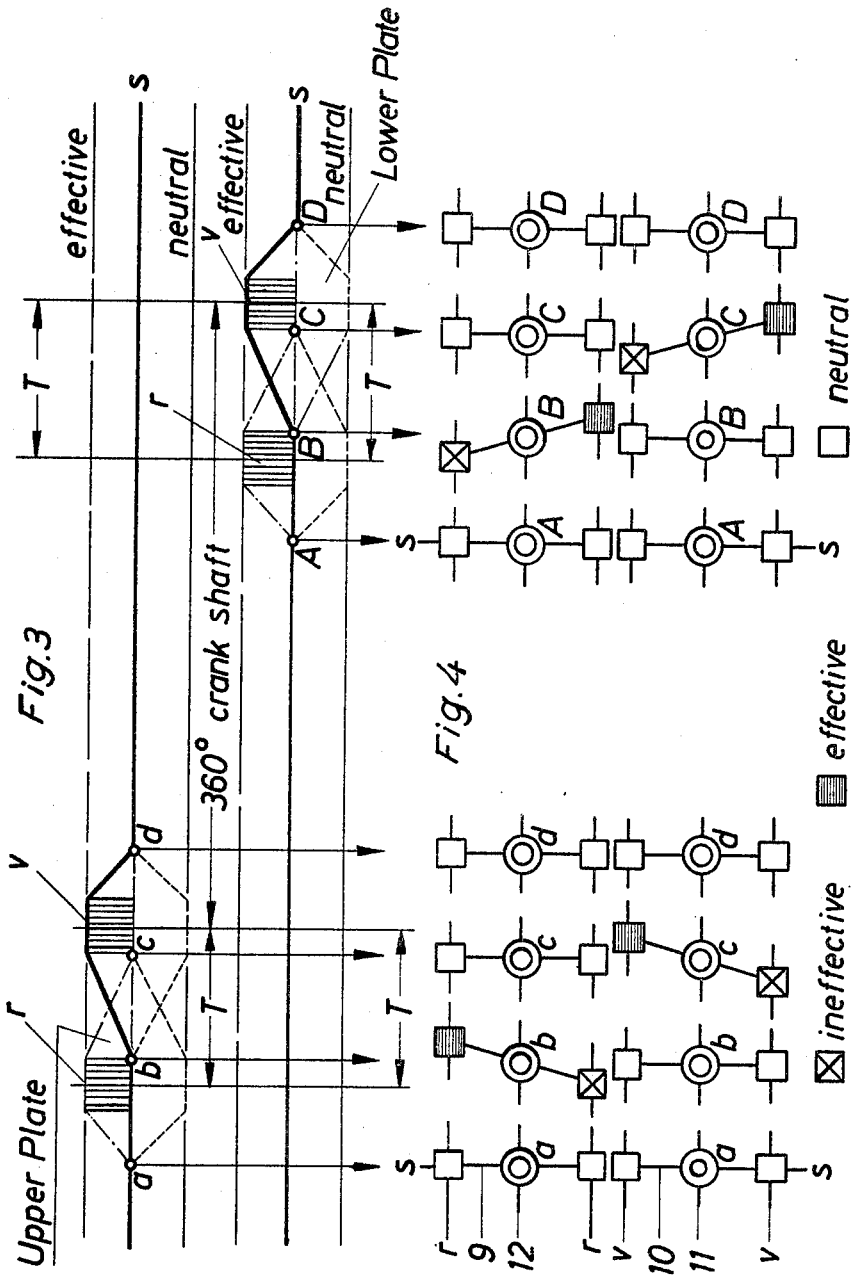

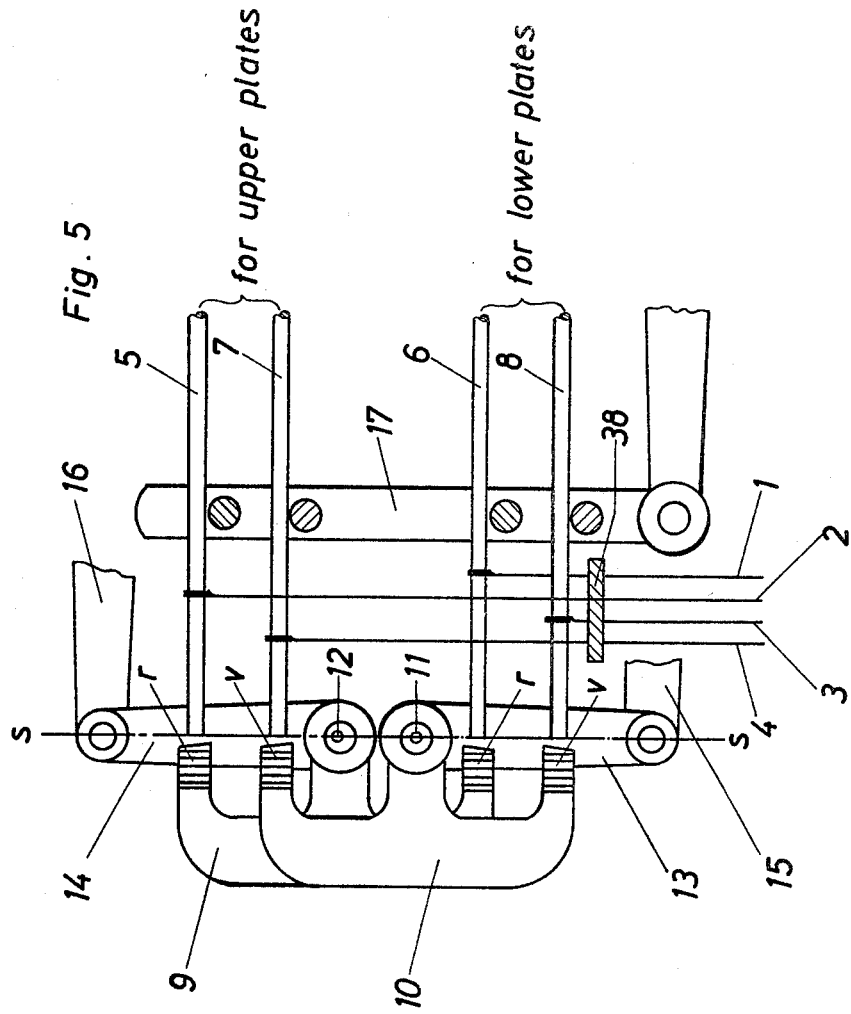

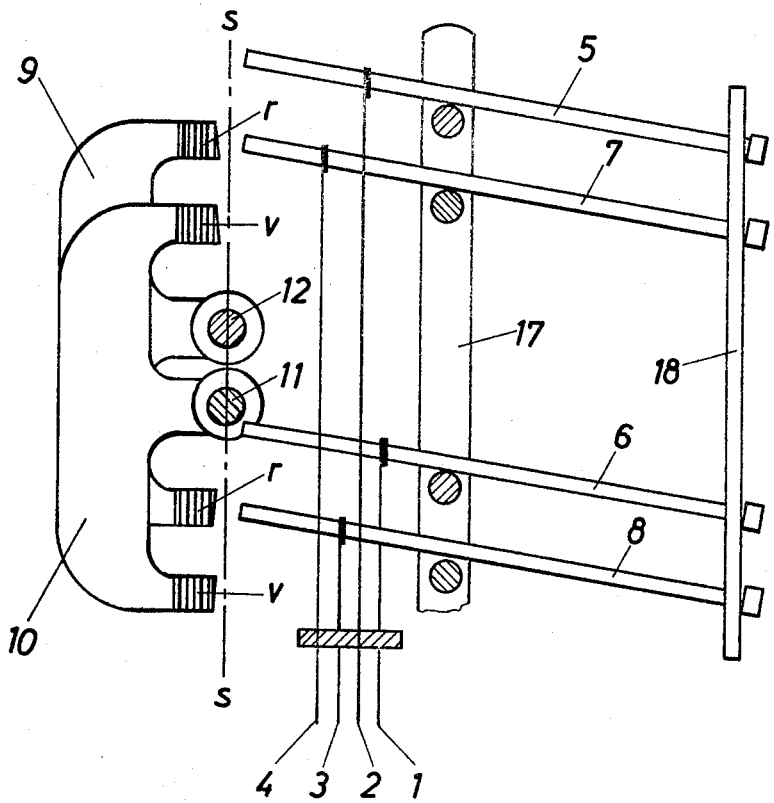

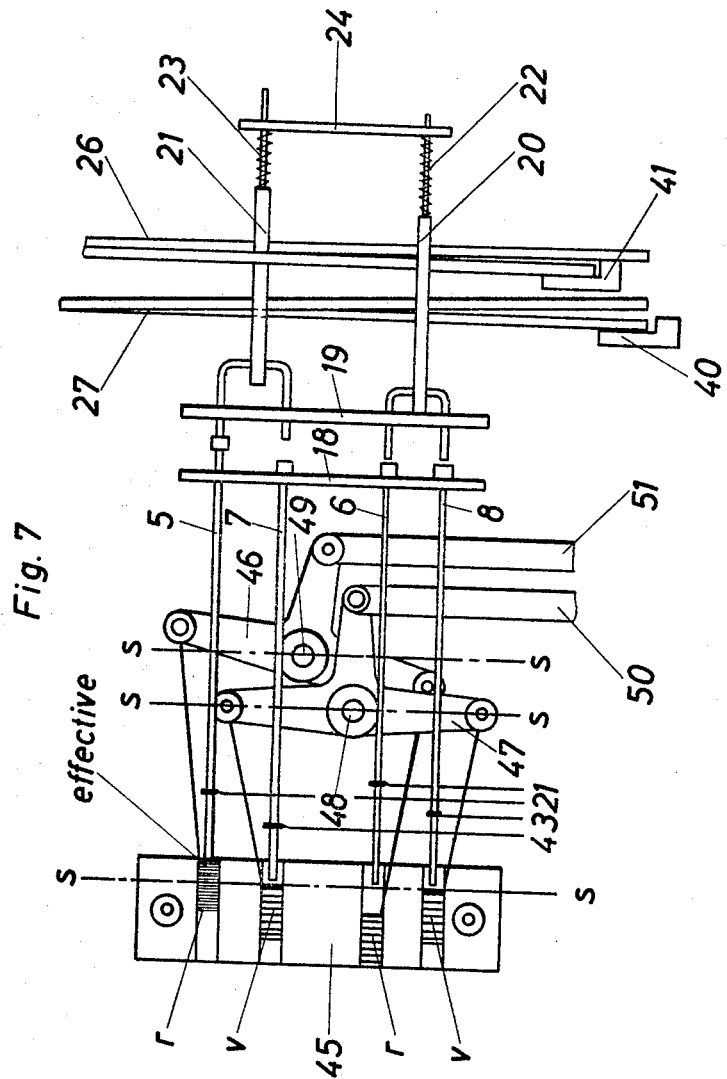

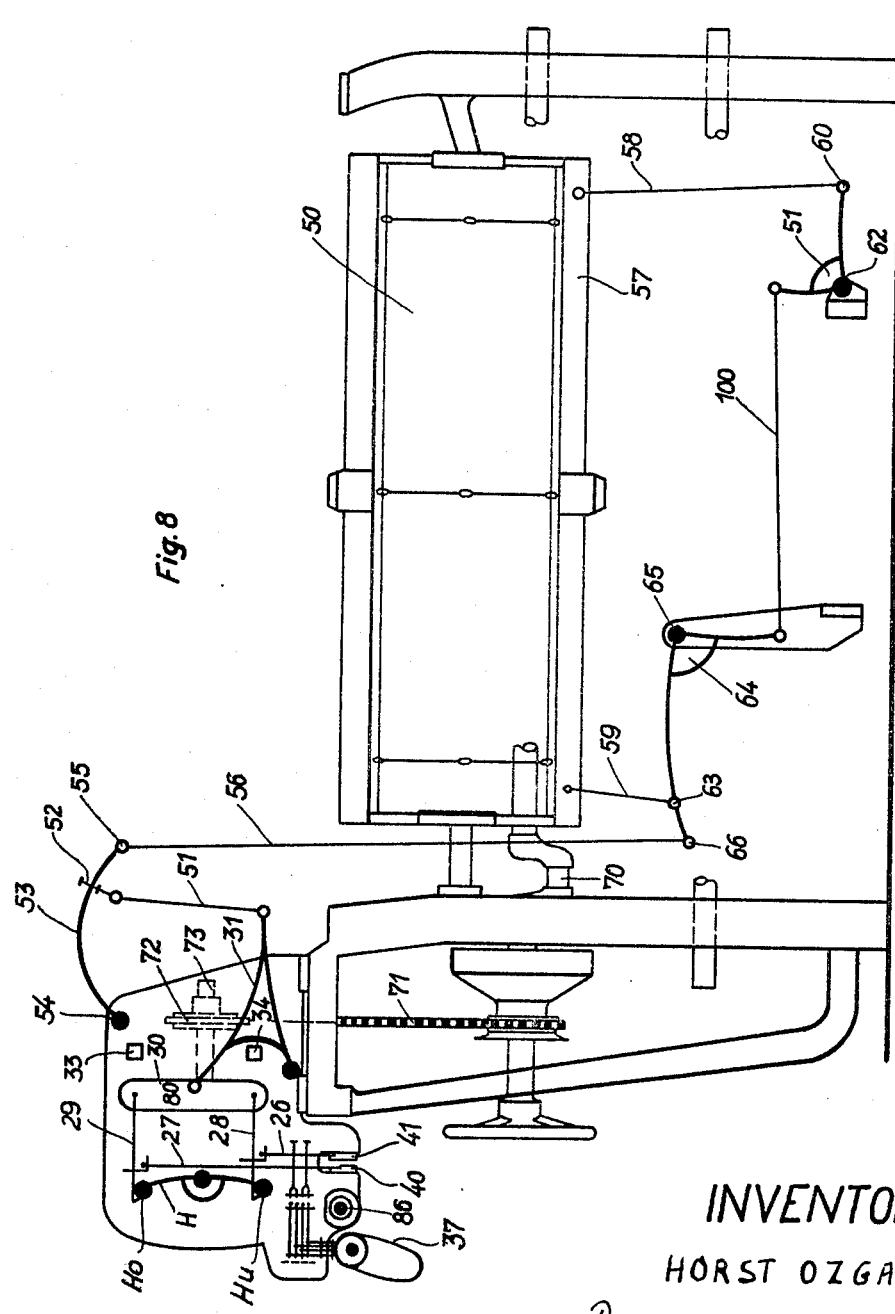

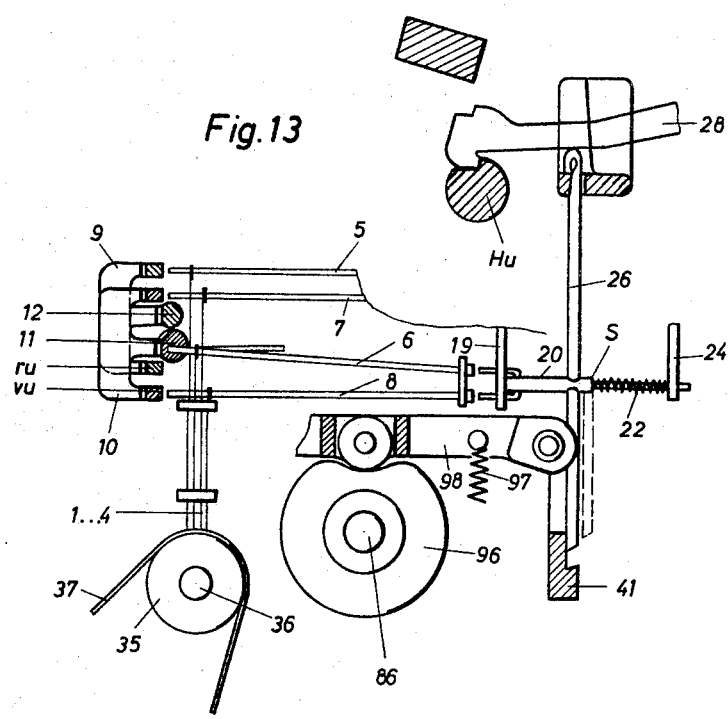

United States Patent Office 3,277,928
Patented Oct. 11, 1966

3,277,928
PRE-NEEDLE APPARATUS FOR DOUBLE LIFT DOBBY MECHANISM

Horst Ozga, Bayreuth, Germany, assignor to Johann Kaiser K.G., Maschinenfabrik und Eisengiesserei, Bayreuth, Germany, a German firm
Filed May 19, 1964, Ser. No. 368,529
Claims priority, application Germany, May 24, 1963, K 49,814
9 Claims. (Cl. 139—68)

This invention relates, in general, to double lift dobby looms and, in particular, to a new and useful double lift dobby loom having an improved driver needle construction.

The present invention refers to a dobby loom in which, for each shaft, there is a baulk lever which is operatively connected therewith. The baulk lever is pivotally connected to draw hooks which cooperate with draw knives. The draw hooks are controlled according to a perforated pattern card and transmit the movement of the draw knives to the shafts. For controlling the draw hooks, the holes of the perforated cards are read by reading needles which are operatively connected to hook moving elements.

In known double lift dobbies for weaving looms the reading needles cooperate with driver needles which are controlled by auxiliary knives. Either each driver needle is controlled by an associated auxiliary knife, thus requiring four auxiliary knives for four reading needles, or the four driver needles are arranged in two pairs with each pair having an auxiliary knife associated therewith so that two auxiliary knives are required. In a modification of the latter construction, the two auxiliary knives are replaced by two rockable bell-crank levers each associated with a pair of driver needles. There are other types of apparatus, which are not related to the present invention, in which the pre-needle mechanism includes transversely displaceable needle guides or angular rack rails.

However, the arrangement of the transmission in present control mechanisms for the hooks of known dobby mechanisms are expensive to manufacture, and particularly so when reliability of operation is a prime factor. In addition, experience indicates that the efficiency of the transmission elements of known control mechanisms is limited.

An object of the present invention is to provide, for a dobby type loom, a control mechanism which is simpler and less expensive in construction while also having increased efficiency and reliability of operation.

A further object of the invention is to provide a control mechanism for dobby looms employing a pair of two-armed rocking levers operatively associated with the reading-needles for operating transmission means for the hook actuators or needles.

In accordance with the invention, the objects may be obtained in either one of two ways. In a first arrangement, the free ends of the rocking levers or rocker arms may be integral with driving heads for moving the driver or pusher rods or needles. In an alternative arrangement, the driver heads may be operatively interposed between the rocker arms and the transmission elements, and these driver heads may be slidably mounted in guides.

In a preferred form of the apparatus, the driver needles or transmission elements are designed as rods having heads protruding through a guiding plate or the like. The driver needles are arranged in pairs, and each pair thereof is cooperable with the legs of a slidably mounted U-shaped yoke or stirrup which transmits the movements of the driver needles to an associated hook actuator. An arrangement of this type may be used with a known form of dobby mechanism in which the ends of the hook actuators or lifting needles are moved, by the driver needles, out of operative relationship with the lifting bars. However, the slidable yokes or stirrups also can be connected with spring biased rocking levers which move the hook actuators.

Preferably, the apparatus is further designed so that equalization of the shafts, to bring all the shafts in the same position, can be effected. Thus, the apparatus may be equipped with a lifting device for the reading needles, and by means of which those driver needles controlling the movement of the hook actuators during forward movement can be moved to a position in front of the driver heads for the backward movement, while the driver needles for the backward movement are moved out of range of their driver heads.

For an understanding of the principles of the invention, reference is made to the following description of typical embodiments thereof as illustrated in the accompanying drawings.

In the drawings:

FIG. 1 is a schematic illustration of one form of apparatus embodying the invention;

FIG. 2 is a schematic illustration of another embodiment of the apparatus;

FIG. 3 is a diagram illustrating the operation of the apparatus;

FIG. 4 is a diagram illustrating the positions of the pairs of rocker arms and the associated pairs of driver heads in accordance with the movement diagram of FIG. 3;

FIG. 5 is an enlarged detail view of a portion of FIG. 2;

FIG. 6 is a view illustrating the means for equalizing the shafts;

FIG. 7 is a view schematically illustrating another embodiment of the invention;

FIG. 8 is a somewhat schematic elevation view of a loom embodying the control mechanism of the invention;

FIG. 13 is a view corresponding to FIG. 1, illustrating additional parts of the mechanism.

Figure 9:
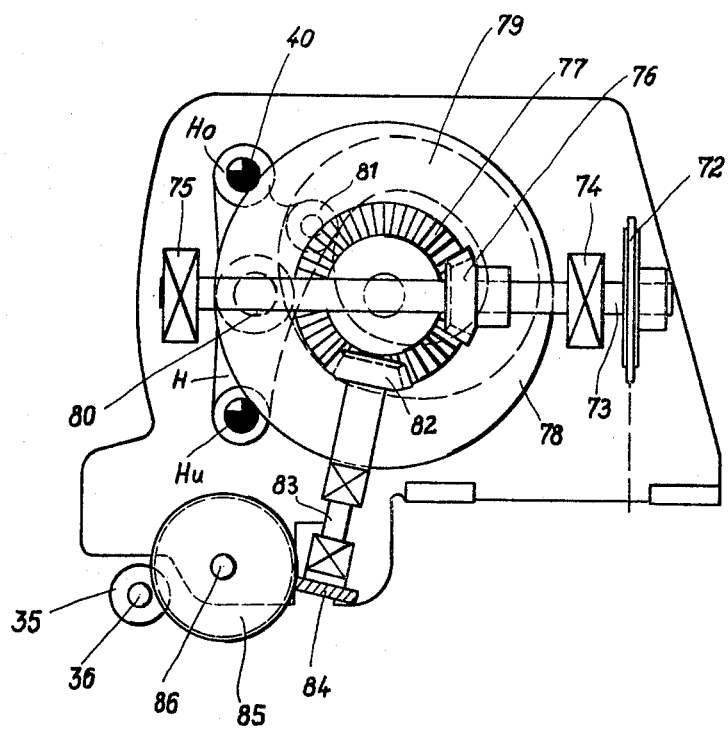
FIG. 9 is an enlarged elevation view illustrating a detail of the driving mechanism.

In the following description and the accompanying drawings, the control mechanism of the invention is illustrated, solely by way of example, as incorporated in a double lift dobby loom of the so-called "Hattersely system," and such a loom has been known universally for decades so that a complete detailed description thereof is believed not necessary.

Referring first to FIG. 1, the apparatus of the invention is illustrated as including four reading needles, 1, 2, 3 and 4 which control the operation of hook actuators, or lifter needles, 26 and 27 operatively associated with hooks 28 and 29, respectively, further controlled by a means of a draw knife device H. Hooks 28 and 29 are pivotally connected, in a known manner, to a baulk lever 30 to which is connected a swing lever 31 for the shaft drive, swing lever 31 being pivotal about an axis 32. Buffers 33 and 34 are cooperable with baulk lever 30 to serve as bearing surfaces for rocking of the baulk lever 30.

Reading needles 1 and 3 are associated with hook actuator 26, and reading needles 2 and 4 are associated with hook actuator 27. Auxiliary knives 41 and 40 function, in a known manner, for lifting hook actuators 26 and 27, respectively. The dobby card cylinder is illustrated at 35 as provided with a driving shaft 36, and a dobby card 37 is trained over cylinder 35 in a well known manner. The reading needles are reciprocably mounted in apertured guides 38 and 39, and their lower ends, as viewed in FIG. 1, cooperate with the dobby card 37. Needles 1–4 are arranged in cooperation with adjacent rows of holes in dobby card 37, each needle being coordinated with a particular row of holes in card 37, as described and shown in the German patent specification 1,612,269.

The actuators 26 and 27 are controlled by transmission elements, such as driver needles or rods 6, 8 and/or 5, 7, which are controlled by the reading needles. Thus, reading needles 1 and 8 control driver elements 6 and 5, respectively, and reading needles 3 and 4 control driver elements 8 and 7, respectively. A lifting bar or device 17 is operatively associated with the driver elements 5, 6, 7 and 8. Hook actuator or lifter needles 26 and 27 extend through apertures in rods 20 and 21, respectively, which latter are loaded or biased by compression springs 22 and 23, respectively, engaged with a fixed surface or bar 24.

In accordance with the invention, the driving elements, or driven needles, 5–8 are controlled by rocker arms 9 and 10 which are oscillatable about pivot axes 11 and 12, respectively, and are rocked by links 16 and 15 pivotally connected to arms 14 and 13, respectively, of the rocker arms 9 and 10, as best seen in FIG. 5. The opposite ends of rocker arms 9 and 10 are designed as driver or pusher heads. Thus, the ends of rocker arm 10 are designed as driver or pusher heads $v$ for "forward" movement, and the opposite ends of rocker arm 9 are designed as driver or pusher heads $r$ for "reverse" movement. For example, if rocker arm 10 is pivoted clockwise, its upper head $v$ will push driver needle or rod 7 to the right, thereby shifting rod 21 to the right and moving the end of hook actuator 27 out of operative association with its auxiliary knife 40. Thereby, hook 29 is released for engagement by draw knife device H, and lever 30 can be swung counterclockwise about its end engaging buffer 34.

The control of actuator 27 is illustrated in enlarged detail at "X" in FIG. 1. Driver needles or elements 5 and 7 extend slidably through a plate 18 and their right-hand ends are formed with or carry heads 5' and 7', respectively. In opposition to these heads, there are the legs of a two-leg or U-shaped yoke 21a which is slidably mounted through apertures in a plate 19 and is connected to the rod 21. If needle 5, for example, is moved to the right, its head 5' will engage the adjacent head of the upper arm of yoke 21a and move rod 21 to the right, to shift hook actuator 27 as described above.

In the arrangement shown in FIG. 2, the operation is essentially the same, except that control of the actuators 26 and 27 is provided by rocking levers 43 and 42, respectively, which are biased by tension springs 44, these rocking levers performing the same function as the auxiliary blades 40 and 41 of FIG. 1.

The operation of the lifting device 17, for equalizing the shafts, i.e., to bring all shafts in the same position, is best illustrated in FIGS. 5 and 6. The lifting device 17 is a manually operated bar having stops or abutments disposed beneath each of the driver elements 5–8, and engageable with the lower surfaces thereof upon lifting of device 17. When device 17 is lifted, driver needles 5 and 6 are moved out of operative relation with their associated driving heads $r$, and driver needles 7 and 8 are moved into operative relation with the driving heads $r$. Under these conditions, when the apparatus is turned through one to two revolutions, all of the shafts will be moved to the lower shed. Conversely, if the machine is moved backward by one to two revolutions, all of the shafts will be moved to the upper shed through the middle shed. In an intermediate position of device 17, all of the shafts will be maintained in the middle position.

A second embodiment of the invention is illustrated in FIG. 7. In this embodiment of the invention, the heads $v$ and $r$ operate as needle or bar pushers, and are slidably mounted in a guide means or rail 45. The heads $v$ and $r$ are not integral with rocker arms 46 and 47, but are connected thereto through links or rods. Rocker arm 46 and 47 are pivoted on axes 49 and 48, respectively, and operated by links 51 and 50, respectively. The arrangement illustrated in FIG. 7 is the equivalent of that illustrated in FIG. 1.

The operation of the apparatus will be clear by reference to FIGS. 3 and 4, and an explanation of the operation of the apparatus will be given with particular reference to these figures. Each driving head $v$ or $r$, in the phases, $a$, $b$, $c$ and $d$, takes a position as shown at the left of FIG. 4 for the even weft numbers, and, in the phases A, B, C and D, the positions shown at the right, for the odd weft numbers. The respective positions are shown in vertical columns in FIG. 4 below the individual phases as shown in FIG. 3. The position of any one driving head $v$ or $r$ can be "effective," "neutral," or "ineffective." When aligned on the neutral axis $s$—$s$, the heads $r/r$ and $v/v$ are also "effective." In this "ineffective" position, all the driver needles 5–8 are free of control by the heads $r$ and $v$, and such position serves for the purpose of lifting or raising all of the reading-in needles during an advance of the dobby card.

If one driving head of a pair of heads is in an "effective" position outside the neutral axis, its associated head is "ineffective." The "effective" position of a head is illustrated, in FIG. 4, by a filled-in square, and the "ineffective" position by a crossed square. The rocking levers 9 and 10 swing symmetrically about the vertically extending neutral axis $s$—$s$ as shown in FIG. 4.

The positions aligned with phase $a$ indicate those before the dead or idle travel T of the draw knife H. If one head of a pair is in a position on the neutral axis, the associated head, on the same rocker arm, is also on the neutral axis. In phase $a$, both head pairs, $v$, $v$ and $r$, $r$ are on the neutral axis, and thus "ineffective."

Phase $b$ represents the beginning of dead or idle travel T of draw knife H. Rocker arm 9 is moved counterclockwise, as viewed in FIG. 4, so that the upper head $r$ is to the right of the neutral axis and thus is operative upon driver needle 5, which is the position of the parts illustrated in FIG. 7. The lower head $r$ of rocker arm 9 is to the left of the neutral axis, and is therefore ineffective. The heads $v$, $v$ of rocker arm 10 are on the neutral axis, as in phase $a$, and are thus in an ineffective position.

Phase $c$ represents the position before and after the end of dead or idle travel T of draw knife H. The position of heads $r$, $r$ is the same as in phase $a$, that is, they are on the neutral axis and thus ineffective. However, rocker arm 10 is moved counterclockwise so that the upper head $v$ is effective upon driver needle 7, as it is to the right of the neutral axis. The lower head $v$ is ineffective, as it is to the left of the neutral axis $s$—$s$.

Phase $d$ represents the position after the end of dead or idle travel T of main blade H. In this phase, the heads $r$, $r$ are the same as in phases $a$ and $c$, and aligned on the neutral axis. The heads $v$, $v$ occupy the same position as in phases $a$ and $b$ and are thus on the neutral axis.

The heads $v$, $v$ are for the purpose of moving driver needles 7 and 8 for the forward movement of the apparatus, and in such a manner that the hole impulses of dobby card 37 are transmitted to the hook actuators 26 and 27 in the right time sequence. Correspondingly, heads $r$, $r$ are for the purpose of moving driver needles 5 and 6 during backward movement of the machine and in such as manner that the hole impulses of dobby 37 are transmitted to hook actuators, or lifting needles, 26 and 27 in the right time sequence.

The action effected by heads $v$ in phases $c$ and C, and the action effected by heads $r$ in the phases $b$ and B are spaced by one revolution of the crank shaft, or by 360°. The phases A, B, C and D have operations which are performed in the same manner as the operations performed in phases *a*, *b*, *c* and *d*. However, in phases A–D, action is effected by the lower head in each case, while the associated upper head remains in either the "neutral" or "ineffective" position. The positions of the heads *r* and *v* in all phases, as compared to each other, result in a uniform operation which is spaced, however, by the interval of one dead or idle travel T of draw knife device H.

Referring now to FIGS. 8–13, a brief description of the operation of a double-lift dobby loom of the Hattersely type, as equipped with the control mechanism of the present invention, will be given.

Referring first to FIG. 8, this figure illustrates the known arrangement for the cooperation of the dobby mechanism with the shafts, only one of which is shown. The shaft 50 is suspended, in a known manner, in the machine frame so that it can be reciprocated between upper and lower positions. The drive of shaft 50 is effected from swing lever 31, shown in FIG. 1 as well as in FIG. 8. A rod 51 has one end pivotally connected to swing lever 31, and clamp 52 is pivotally connected to the opposite end of rod 51. Arcuate lever 53 extends through clamp 52 and has one end pivoted at the fulcrum 54. Clamp 52 may be locked at any position along arcuate rod 53. A swivel joint 55 connects the free end of lever 53 to the upper end of a lever 56.

Two rods, 58 and 59, are pivotally connected to the lower beam 57 of shaft 50. The lower end of rod 58 is pivotally connected, at 60, to one end of angle lever or bell crank 61 which is rockably mounted on a fixed fulcrum 62. The lower end of rod 59 is pivotally connected, at point 63, to one leg of an angle lever or ball crank 64 which is rockable about a fixed fulcrum 65. Bell cranks 61 and 64 are interconnected by a link or tie rod 100. The lower end of rod 56 is pivotally connected to the end of one arm of bell crank 64, as indicated at 66.

With the described arrangement, rocking of swing lever 31 reciprocates shaft 50 vertically. The angular distance through which point 55 oscillates is determined by the adjustment of clamp 52 along arcuate lever 53.

The driving crank shaft of the loom is indicated at 70 and a shaft 73 is connected with crank shaft 70 through a chain drive 71 and a sprocket 72. Shaft 73 is the drive shaft for the dobby mechanism and rotates at the same angular velocity as the driving crank shaft 70.

The function of shaft 73 is illustrated in FIG. 9. Shaft 73 is rotatably mounted in bearings 74 and 75 and has fixed thereto a bevel gear 76 meshing with a bevel gear 77. A disc 78 is fixed to rotate with bevel gear 77, and a surface of disc 78 is formed with an eccentric channel or groove 79. The draw knife device H is illustrated as having two main knives H$o$ and H$u$, and draw knife device H oscillates about a pivot 80. A roller 81 is rotatably mounted on draw knife device H and is engaged in eccentric groove 79. Thus, when shaft 73 rotates, an oscillatory movement is imparted to draw knife device H through eccentric groove 79 and roll 81.

A bevel pinion or bevel gear 82 also meshes with the bevel gear 77, and is secured to a shaft 83 on the other end of which is a spiral gear 84 which meshes with a spiral gear 85 on a shaft 86. Shaft 86 is a cam shaft as will be described later, which rotates at half shot number.

Figure 10:
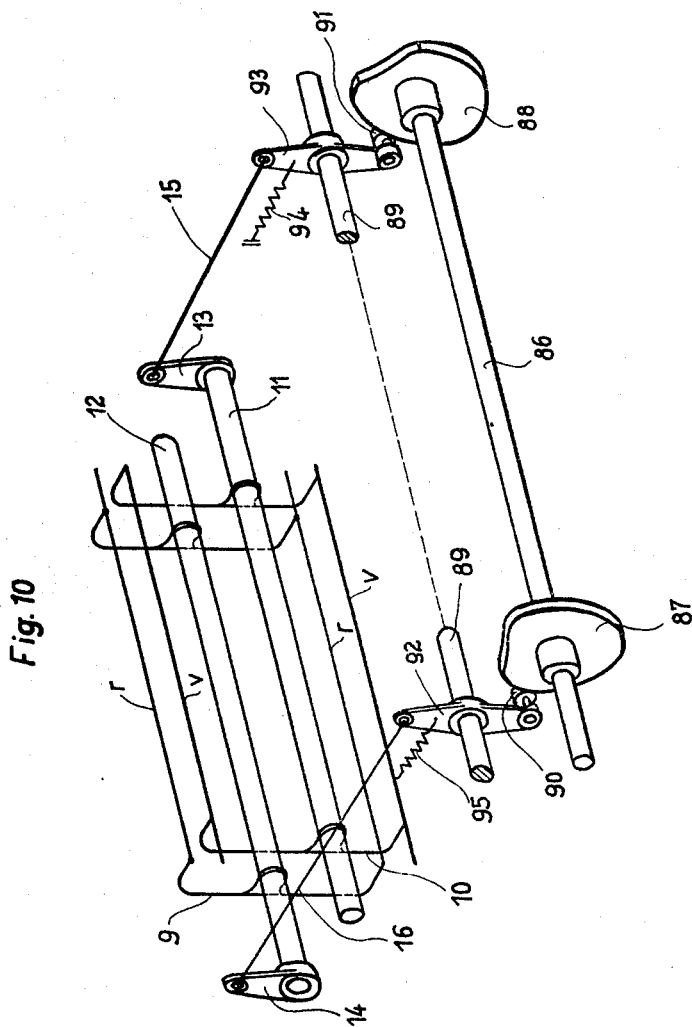
FIG. 10 is a somewhat schematic elevation view of the driving mechanism essentially looking from the right of FIG. 9.

As shown in FIG. 5, rocker arms 9 and 10 are driven by means of rods 15 and 16. FIG. 10 illustrates the connection of these rods to the drive. On shaft 86 there are fixedly mounted two control eccentrics or cams 87 and 88, of which the cam 87 is a control means for backward (*r*) movement and the cam 88 is the control means for forward (*v*) movement. Rollers 90 and 91 are engaged with the cams 87 and 88, respectively, and are rotatably mounted in the ends of levers 92 and 93, respectively, oscillatably mounted on a pivot shaft 89. Springs 94 and 95 bias levers 93 and 92, respectively, in a direction with the associated cams. The ends of rods 15 and 16 of FIG. 5 are pivotably connected to the opposite ends of levers 92 and 93 respectively, so that oscillation of levers 92 and 93 will oscillate the arms 14 and 13 and thus the rocker arms 9 and 10, respectively. This movement is effected responsive to rotation of shaft 86, and through the cams 87 and 88.

Figure 11:
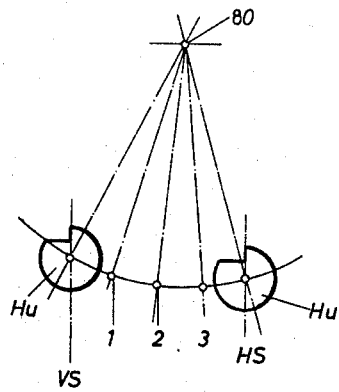
FIG. 11 is a diagram illustrating the movement of a draw knife.
Figure 12:
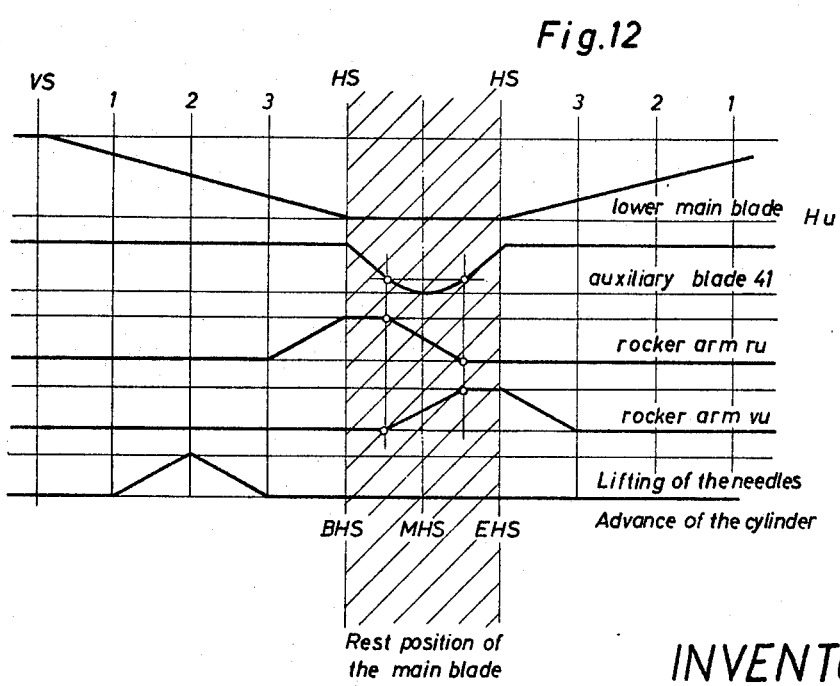
FIG. 12 is a diagram, similar to FIG. 3, illustrating the operation of several parts of the loom.

FIGS. 11, 12 and 13 illustrate the sequence of movement for the lower draw knife H$u$, and the movement for the upper blade is analogous but offset by 180°. FIG. 11 illustrates the pattern of motion of the lower knife H$u$, and this knife swings about the pivot axis 80 between a frontal position VS and a rear position HS. In position HS, the hook is exchanged while, in the position VS the shed stands still. FIG. 11 further illustrates three intermediate positions 1, 2 and 3 which are included in the diagram of FIG. 12.

Referring momentarily to FIG. 13, this figure illustrates the driving of the rear auxiliary knife 41, whose operation is coordinated with the operation of the draw knife H$u$. Knife 41 is operated by an eccentric or cam 96 on shaft 86, which latter is also shown in FIGS. 9 and 10, through a lever 98 which is loaded by a spring 97 so as to maintain a roller engaged with cam 96, the free end of this lever being connected to the knife 41.

Referring to FIG. 12, at the point BHS, the auxiliary knife starts to sink and, at point MHS, it reaches its lowest point after which it begins to rise. The auxiliary knife 41 reaches its highest level at point EHS. The motions of the driving heads $v_u$ for the forward run and $r_u$ for the backward run are coordinated with movement of lower draw knife H$u$ and the auxiliary knife 41. The pusher needles or transmission elements, such as 5 and 6, either are positioned in alignment with a respective head through the medium of dobby card 37 and needles 1 and 4, when there is a hole in the card, or they are elevated about the associated head when there is no hole in the card 37. If one of the pusher needles or rods 5–8 is pushed by a head $v_u$ or $r_u$, the hook actuator 26 is pressed by the member 20 out of the range of action of auxiliary knife 41, as shown in broken lines in FIG. 13. If the auxiliary knife 41, in such a case, rises it cannot engage under the hook actuator and lift it. Consequently, the hook 28 is not lifted and remains in engagement with lower main blade H$u$ so as to be drawn thereby. The shaft therefore moves upwardly.

If draw knife H$u$ reaches its rear position HS by passing through position 1, 2 and 3, the head $r_u$ starts to push at positions 3. In the position HS of FIG. 11, which corresponds to the position BHS of FIG. 12, head $r_u$ has reached its most forward position. This position is maintained until the auxiliary knife 41 has been lowered far enough for hook actuator 26 to be released.

At such time, the head $r_u$ retracts while head $v_u$ is advanced to start pushing. In the position MHS, both heads are aligned with each other. Head $v_u$, just before the point EHS, reaches its most advanced position and remains therein until the point EHS is attained. Auxiliary knife 41 is again lifted to lift the hook actuator, which now is not pushed laterally by head $v_u$, thus effecting an operation of the lower shed. The hook actuator, which has been pushed laterally out of the way, remains lowered. Consequently, the coordinated hook remains engaged with lower draw knife H$u$ and acts on the shaft so that the shaft will be elevated. From point EHS, head $v_u$ is retracted and, at position 3 is again in the starting position. The same movement, offset by 180°, takes place for the following weft, but is effected with parts not shown such as the upper hook, the upper draw knife and the upper head.

Lifting of needles 1–4 and advance of the card cylinder is always effected after two wefts and between the points 1 and 3, and before draw knife H$u$ has reached the position HS.

While specific embodiments of the invention have been shown and described in detail to illustrate the application of the principles of the invention, it will be understood that the invention may be embodied otherwise without departing from such principles.

What is claimed is:

1. In a double lift dobby for looms movable in forward and reverse directions and controlled by a perforated pattern card through four rows of reading needles and in which the rows are separated into pairs of rows with each pair associated with a respective shaft lever, the needles of a row pair being constructed and arranged to read consecutive picks of the pattern card for controlling the positions of the respective shaft lever via hooks, drawing knives and baulk lever, included in the loom, in either direction of the machine, the improvement comprising a plurality of reading needles, a plurality of driving elements each acted upon by an associated one of the said reading needles, a pair of rockable driven levers associated with each set of four driving elements, said four driving elements of each set being displaceable by the associated pair of rockable driven levers, one lever being effective to displace two driving elements for forward travel the other being effective to displace two different driving elements for backward travel of the loom, said levers being double-ended elements rockable about a central axis and having operatively associated with both ends driving heads, each head acting upon the free end of one of the associated four driving elements, the said rockable levers being arranged in such a manner that the sequence of operation of their respective driving heads alternates.

2. A double lift dobby according to claim 1 wherein the driving heads (r, v) are integral with the ends of their respective rocking levers (9, 10).

3. A double lift dobby according to claim 1 wherein the driving heads (r, v) are slidably mounted in a supporting element (45) and are connected to the arms of the rocking levers (46, 47) by means of transmission elements (FIG. 1).

4. A double lift dobby according to claim 1 wherein one driving head operatively associated with a respective rocking lever is in its ineffective position when the other driving head operatively associated with the same lever is in its effective position (FIG. 4).

5. In a double lift dobby for looms, movable in forward and reverse directions and controlled by a perforated pattern card through four rows of reading needles and in which the rows are separated into pairs of rows with each pair associated with a respective shaft lever, the needles of a row pair being constructed and arranged to read consecutive picks of the pattern card for controlling the positions of the respective shaft lever via hooks, drawing knives and baulk lever, included in the loom, in either direction of the machine, the improvement comprising a plurality of reading needles, a plurality of driving elements each acted upon by an associated one of the said reading needles, a pair of rockable driven levers associated with each set of four driving elements, said four driving elements of each set being displaceable by the associated pair of rockable driven levers one lever being effective to displace two driving elements for forward travel the other being effective to displace two different driving elements for backward travel of the loom, said levers being double-ended elements rockable about a central axis and having operatively associated with both ends driving heads, each head acting upon the free end of one of the associated four driving elements, the said rockable levers being arranged in such a manner that the sequence of operation of their respective driving heads alternates; the two driving elements (5, 7–6, 8) associated with the two reading needles (2, 4–1, 3) of one row being workably engageable with one transmission element (21a) which acts upon an element (20, 21) controlling the position of the respective hook (28, 29).

6. In a double lift dobby for looms, movable in forward and reverse directions and controlled by a perforated pattern card through four rows of reading needles and in which the rows are separated into pairs of rows with each pair associated with a respective shaft lever, the needles of a row pair being constructed and arranged to read consecutive picks of the pattern card for controlling the positions of the respective shaft lever via hooks, drawing knives and baulk lever, included in the loom, in either direction of the machine, the improvement comprising a plurality of reading needles, a plurality of driving elements each acted upon by an associated one of the said reading needles, a pair of rockable driven levers associated with each set of four driving elements, said four driving elements of each set being displaceable by the associated pair of rockable driven levers one lever being effective to displace two driving elements for forward travel the other being effective to displace two different driving elements for backward travel of the loom, said levers being double-ended elements rockable about a central axis and having operatively associated with both ends driving heads, each head acting upon the free end of one of the associated four driving elements, the said rockable levers being arranged in such a manner that the sequence of operation of their respective driving heads alternates; the said transmission element being a longitudinally slidable U-shaped yoke (21a) the legs of which are aligned with two consecutive driving elements (5, 5'–7, 7') while the bight of the yoke is connected to the element (20, 21) controlling the position of the associated hook (28, 29).

7. In a double lift dobby for looms, movable in forward and reverse directions and controlled by a perforated pattern card through four rows of reading needles and in which the rows are separated into pairs of rows with each pair associated with a respective shaft lever, the needles of a row pair being constructed and arranged to read consecutive picks of the pattern card for controlling the positions of the respective shaft lever via hooks, drawing knives and baulk lever, included in the loom, in either direction of the machine, the improvement comprising a plurality of reading needles, a plurality of driving elements each acted upon by an associated one of the said reading needles, a pair of rockable driven levers associated with each set of four driving elements, said four driving elements of each set being displaceable by the associated pair of rockable driven levers one lever being effective to displace two driving elements for forward travel the other being effective to displace two different driving elements for backward travel of the loom, said levers being double-ended elements rockable about a central axis and having operatively associated with both ends driving heads, each head acting upon the free end of one of the associated four driving elements, the said rockable levers being arranged in such a manner that the sequence of operation of their respective driving heads alternates; the hook controlling element being a spring (22, 23) biased longitudinally movable rod (20, 21).

8. A double lift dobby according to claim 6 wherein the hook controlling element is a spring (44) biased rockable lever (42, 43) connected with a power transmission element (20, 21) which is mounted in the bight of the U-shaped yoke.

9. In a double lift dobby for looms, movable in forward and reverse directions and controlled by a perforated pattern card through four rows of reading needles and in which the rows are separated into pairs of rows with each pair associated with a respective shaft lever, the needles of a row pair being constructed and arranged to read consecutive picks of the pattern card for controlling the positions of the respective shaft lever via hooks, drawing knives and baulk lever, included in the loom, in either direction of the machine, the improvement comprising a plurality of reading needles, a plurality of driving elements each acted upon by an associated one of the said reading needles, a pair of rockable driven levers associated with each set of four driving elements, said four driving elements of each set being displaceable by the associated pair of rockable driven levers one lever being effective to displace two driving elements for forward travel the other being effective to displace two different driving elements for backward travel of the loom, said levers being double-ended elements rockable about a central axis and having operatively associated with both ends driving heads, each head acting upon the free end of one of the associated four driving elements, the said rockable levers being arranged in such a manner that the sequence of operation of their respective driving heads alternates; the two driving elements (7, 8) associated with the driving heads (v) of one rocking lever (10) being positionable for engagement with the driving heads (r) of the other rocking lever (9) while the two other driving elements (5, 6) are movable out of reach of any driving head, a lifting bar being provided for switching over the driving elements.

References Cited by the Examiner

UNITED STATES PATENTS

| | | | |
|---|---|---|---|
| 1,672,434 | 6/1928 | Staubli | 139—68 |
| 2,815,044 | 12/1957 | Staubli | 139—71 |
| 2,856,964 | 10/1958 | Bergstrom et al. | 139—68 |

FOREIGN PATENTS

| | | |
|---|---|---|
| 942,474 | 11/1963 | Great Britain. |
| 306,341 | 6/1955 | Switzerland. |

MERVIN STEIN, *Primary Examiner.*

DONALD W. PARKER, *Examiner.*

H. S. JAUDON, *Assistant Examiner.*